Jan. 9, 1962 C. F. SCHUH ET AL 3,016,244

MINIATURE MAGNETIC SOUND RECORDING AND REPRODUCING DEVICE

Filed June 3, 1955 4 Sheets-Sheet 1

INVENTORS by Wenderoth, Lind & Ponack

Attys

INVENTORS
Günter Hermann
Carl F. Schuh
by Wenderoth, Lind & Ponack
Attys.

MINIATURE MAGNETIC SOUND RECORDING AND REPRODUCING DEVICE

Filed June 3, 1955

INVENTORS
by Wenderoth, Lind & Ponack
Attys.

MINIATURE MAGNETIC SOUND RECORDING AND REPRODUCING DEVICE

Filed June 3, 1955 4 Sheets-Sheet 4

INVENTORS

Attys.

United States Patent Office 3,016,244

Patented Jan. 9, 1962

3,016,244

MINIATURE MAGNETIC SOUND RECORDING AND REPRODUCING DEVICE

Carl Friedrich Schuh, Landshut, Lower Bavaria, Ernst Genning, Fassberg, near Celle, and Günter Hermann, Ronnenberg, Hannover, Germany, assignors to Protona Productionsgesellschaft für electro-akustische Geräte G.m.b.H., Hannover, Germany Filed June 3, 1955, Ser. No. 513,056
Claims priority, application Germany July 29, 1954
9 Claims. (Cl. 274—4)

This invention concerns a miniature magnetic sound recording and reproducing device, especially a pocket-sized device, for sound recording on and reproduction from a magnetically modulatable and erasable sound carrier, preferably a sound wire, having an electrical amplifier and a driving mechanism for operating for several hours, independently of a main or public electricity supply, during which time the device is fed by means of batteries or accumulators.

Various constructions of such devices are known. A pocket-sized device having an electric motor drive from batteries has proved particularly good. The batteries, the amplifier and the driving mechanism are accommodated in a housing jointly with the electric motor and the spools for the sound carrier. The total weight of this device is less than 1 kilogram.

It is a primary object of the invention to advance the state of perfection of such miniature devices to the highest possible degree.

Another object of the invention is to allow longer recording and reproduction periods to be obtained with such miniature devices without change of battery, and for the devices yet to be as reliable as possible in operation. For this purpose the speed of the sound carrier is reduced.

Larger systems for amateur and professional operation frequently make use of two different sound carrier speeds. A further object of this invention is to render this possible also with the miniature device proposed by the invention, merely by closing a simple bridging contact on a motor speed governor. In accordance with the invention, this speed governor has two centrifugal contact systems for two different motor speeds. On connecting the second system, the first is automatically disconnected in such a way that it remains open. The two speeds of rotation make a high and a low sound carrier speed possible. The lower speed provides the longer period of recording, which renders possible an uninterrupted period of recording of approximately 5 hours on spools of only 45 mm. in diameter and 9 mm. thick. With the higher sound carrier speed, a considerably better audio quality is obtained, which makes the miniature device suitable even for the recording of amateur music.

The governor elements are fitted in a completely closed governor member to avoid soiling and to obtain a high initial contact pressure. The centrifugal weights of the governor move in radial bores of the governor member and rub against the walls of the bores. The friction can be well controlled, so that undesired oscillations of the centrifugal weights are avoided. In addition, the governor has only a small force of inertia on account of its compact and symmetrical construction.

A further object of the invention resides in a particularly simple construction of reversing gear for the driving mechanism, which for this purpose is operated by means of a friction wheel drive. A slider member guides a coupling roller backwards and forwards to frictionally connect it either with a forward driving plate or with a rewinding plate. The driving plates are coupled with the appropriate spools.

The coupling roller presses with a definite bearing pressure against the driving plates. In order that the friction surfaces do not become worn or that compensation for wear and tear is continually made, the coupling roller is pressed resiliently against the driving plates, and hence, even with wear, a perfect drive of the spools is ensured. Moreover the coupling roller has the problem of compensating the short irregularities in the speed of rotation of the spools, occasioned by the motor regulation. For this purpose, in accordance with the invention, the coupling roller consists of a centrifugal mass and of a driving roller resiliently coupled therewith. The resilient coupling can be effected by means of a spring or a resilient disc of soft rubber or the like. The formation of the driving roller as a spring housing with a helical spring secured in one side of the spring housing with its inner end coupled to a pin provided on the front face of the centrifugal mass has proved particularly effective. The centrifugal mass of the driving roller coupled with the driving means can thereby be advanced or retarded, and variations in the motor speed compensated.

Yet another object of the invention is to provide for simple manipulation of the device. For this purpose, the driving mechanism proposed by the invention is connected with push buttons for the operations stop, rewind, reproduction and recording. The miniature pocket-sized device is thus just as conveniently and easily operable as the large box and desk devices of the prior art.

According to a still further feature of the invention, the device preferably operates with steel wire as the sound carrier. The steel wire consists of special alloys of only very small diameter, for example, 0.05 mm. The sound carrier must be perfectly wound in order that it does not become entangled and break during winding or unwinding. For this purpose a speech head control device guides the recording head of the sound carrier to and fro along the thickness of the spools. Such a head control device is constructed, in accordance with the invention, as a crank control means. In this case, a pin is disposed and slides in a cam-shaped recess formed in a cylinder, and so positively controls the head independently of springs, such as are usually needed when the head control is effected by cams.

Another feature of the invention also provides for a position indicator, with which can be read off at any moment how much sound carrier is already run off and how much is still available for recording purposes. The position indicator is externally visible on the front face of the device, and consists of a rotating roller whose surface is divided into two sections, divided by a junction line lying obliquely to the axis of rotation. The point of intersection of this line and of a fixed bar on the housing, provided with time scales or length scales, gives the measure of the time or length of the sound carrier which has been run off. One revolution of the roller corresponds to the total running time or length of the sound carrier.

Furthermore, the invention provides an end cut-out device, the members of which, for the purpose of avoiding the use of separate space, are arranged in the spools themselves. The end cut-out device cuts out both at the end of the forward motion and at the end of the rewind motion. The release mechanism of the end cut-out device consists of bell crank levers which are pivotally mounted on a spindle arranged at right angles to the axis of the spool. The main arm of each bell crank lever preferably runs parallel to the axis of the spool and level with the surface thereof, and normally the sound wire presses the cut-out mechanism into the hub of the spool. If the sound carrier is completely run off, however, a pressure spring pivots the release mechanism, which for its part breaks a contact in the motor circuit and thereby disconnects the device. The end of the sound carrier is fixed on the hub of the spool at a point diametrically opposite to the release mechanism.

In the device proposed by the invention, after the cut-out mechanism has operated, the motor is switched on again by means of a motor circuit holding switch, which temporarily bridges the disconnected contacts of the end cut-out device and give a sufficient impulse to the drive that each spool rotates at least once, independently of the end cut-out. The end cut-out is thereby again closed and the motor circuit thus completed.

It is also a feature of the invention that the sound carrier spools are mounted on partly conical recording hubs and thus are connected with the driving mechanism. On the upper end, the recording hubs preferably have resiliently mounted balls or pins which engage in a conical counterbore of the spools. Tilting of the spool is prevented by a cylindrical guiding surface of the conical surface of the recording hubs.

Finally, the device has also a voltmeter readable externally of its housing, and from which the fall in the voltage of the battery can be observed in the case of a battery drive. This voltmeter may conveniently be located beside the push buttons.

The foregoing and other objects and advantages of the invention will become apparent from the following description, taken in connection with the accompanying drawings, which are given by way of example, and in which:

FIG. 1 is a side elevation of the miniature magnetic sound recording and reproducing device proposed by the invention, and a motor driving mechanism therefor; the figure shows the device set in the forward running position, no push button being depressed, and with the motor switched off by the end cut-out device after the completed forward run. In this, and in the remaining figures, the amplifier is omitted for the sake of clarity;

Figures 1, 3, 4, 5, 5A, 5B, 11:
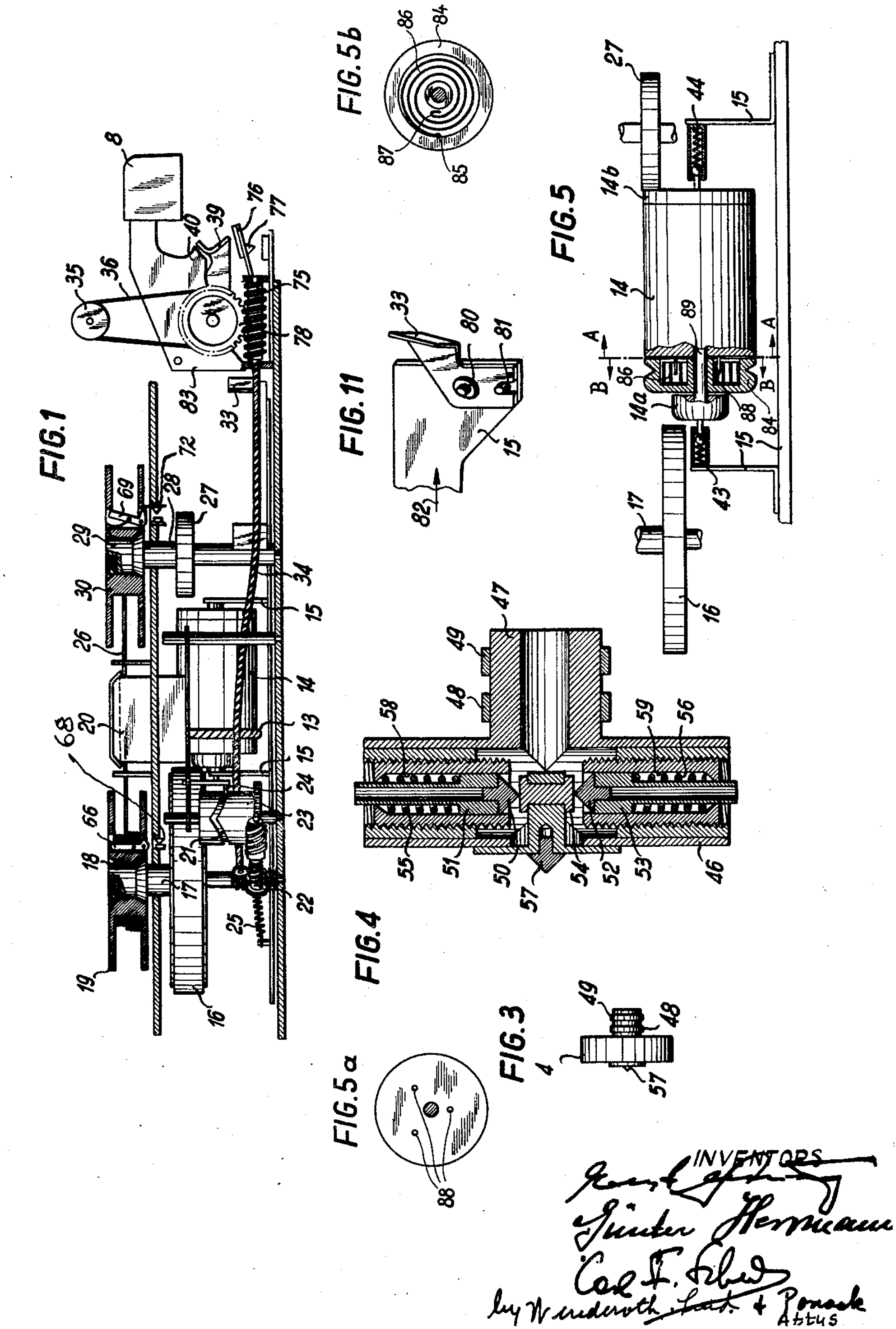
FIG. 3 is a side elevation, substantially to life-size scale, of the electrical centrifugal governor.
FIG. 4 is a sectional elevation to an enlarged scale of the electrical centrifugal governor of FIG. 3, showing details of the contact construction.
FIG. 5 is a detail view, partly in section, of the coupling roller of the reversing driving mechanism.
Figure 6:
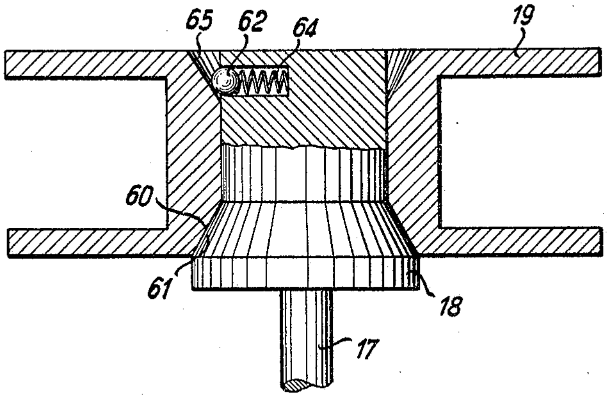
Figure 7:
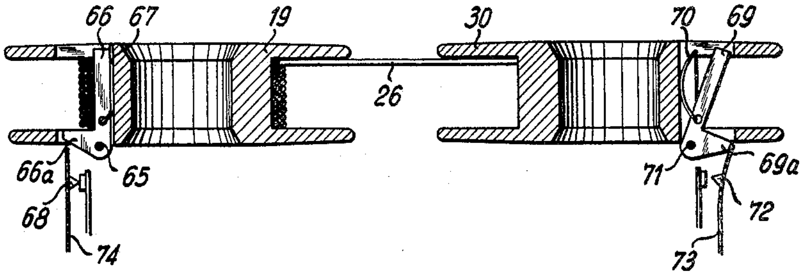
Figure 10:
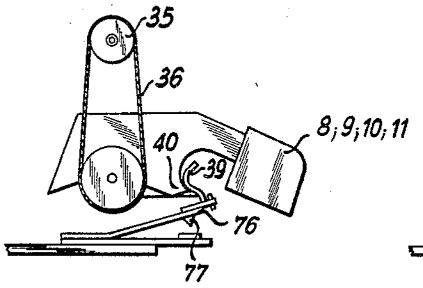
Figure 9:
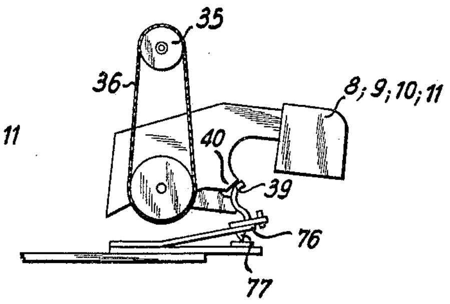
Figure 8:
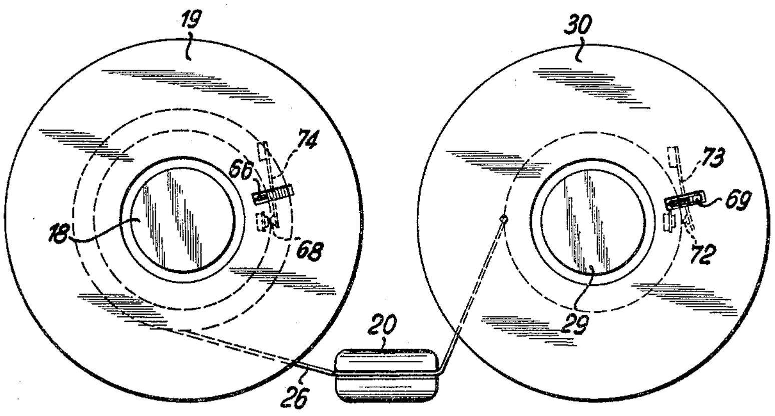

FIG. 5*a* is a plan view of the front face of the centrifugal mass, viewed in the direction of the arrow A of FIG. 5;

FIG. 5*b* is a plan view of the driving roller and the spring housing, viewed in the direction of the arrow B of FIG. 5;

FIG. 6 is a section showing the mounting and centering of a spool on the recording hub;

FIG. 7 is a detail in section, of the end cut-out device, in the switched-off position after completion of the forward run;

FIG. 8 is a horizontal plan view corresponding to FIG. 7;

FIG. 9 is a detail, in section, of the push button assembly and a motor circuit holding switch incorporated therein, with a button half depressed;

FIG. 10 is a detail similar to that of FIG. 9, but with a button completely depressed; and FIG. 11 is a perspective view showing details of the drive mechanism reversing lever shown in FIG. 1.

*The push-button control for the driving mechanism*

Figure 2:
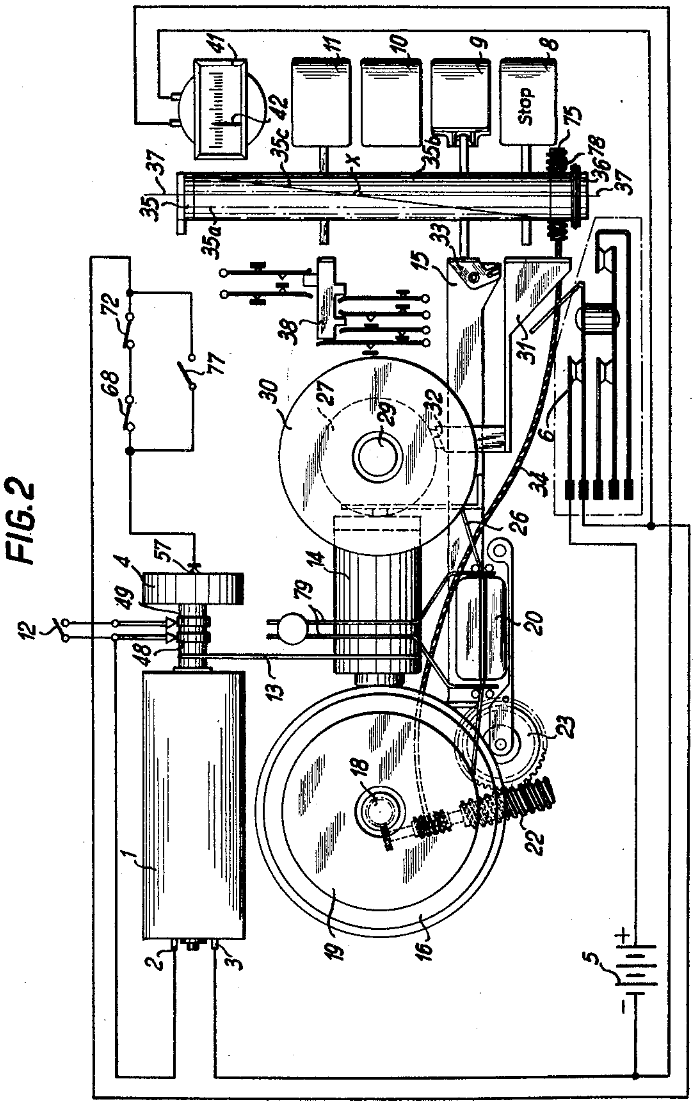
FIG. 2 is a plan view of the device shown in FIG. 1, but set for the rewind run, with the rewind button depressed.

In the miniature magnetic sound recording and reproducing device shown in FIGS. 1 and 2, a driving motor 1, which is preferably a commutator motor with a permanent magnetic field, has two terminals 2, 3 to which power from a battery 5 is supplied, the power supply circuit being completed via a contact 6 of a main switch.

A further terminal may also be provided to enable power to be fed to the motor from a public electricity supply. The contact 6 is permanently closed, except when a stop button 8 is pressed down. The motor 1 has a speed governor 4, and the battery voltage reaches the motor terminals 2, 3 via slip rings 48, 49 of the governor 4, a governor contact 57, and either end cut-outs 68, 72 or a motor circuit holding switch 77 (hereinafter more fully described). A bridging contact 12 on the slip rings 48, 49 allows change over of the governor 4 to a higher speed. The motor 1 first drives a coupling roller 14 by way of a continuous belt 13, which roller can be engaged with a reversing rod 15 actuated by a rewind button 9. If the rewind button 9 is not pressed, the coupling roller 14 is engaged for forward running with a driving plate 16. Since the rewind button 9 has to reverse the direction of rotation of the coupling roller 14, for example when the recording medium, such as a magnetisable wire 26 is rewound after a recording operation and prior to reproducing the recording which has been made, a shift lever 33 is interposed between the button 9 and the reversing rod 15, as shown in more detail in FIG. 11. The rewind button 9 has a lever 83 which presses against the shift lever 33, and the latter, while rotating round a pivot pin 80, takes the reversing rod 15 with it in the direction of the arrow 82, by way of a pin 81 carried on the reversing rod. FIG. 5 shows the coupling roller in engagement with the rewind disc 27 for the rewind run. For the forward run the coupling roller 14 drives a driving plate 16, which is rigidly connected with the spindle 17 of a recording hub 18 carrying a spool 19. The spindle 17 of the forward driving plate 16 at the same time drives the control mechanism of the speech head 20, actuated by a curved cam 21 by way of a worm gear and wheel 22. The cam 21 is a groove formed in a cylindrical body 23 secured to the worm wheel, and is engaged by a scanning pin 24. In this way the head, fixed on a holder therefor, receives a reciprocating motion for guiding the sound wire on the spools.

FIGS. 5, 5*a* and 5*b* show the coupling roller 14 in detail. Two springs 43, 44 always resiliently urge the coupling roller 14 against the plates 16 or 27 respectively, even after wear of the friction facings **14*a* for the forward motion or 14*b* for the rewind motion, the former comprising rubber or Perbunan, or any other similarly suitably adapted material. The spring not required for the time being, spring 43 in the forward motion and spring 44 in the rewind motion, is put out of action by the reversing rod 15. Moreover, during the forward run, a tension spring 25 (see FIG. 1) effects a good frictional contact of the coupling roller 14 with the forward driving plate 16. The drive of the coupling roller 14 is effected via a driving roller 84, which is resiliently connected with the coupling roller 14. For this purpose the driving roller 84 is constructed as a spring housing and contains a helical spring 86 secured at the point 85 of its inner wall. This helical spring 86 terminates inwardly in a hook 87. The driving roller 84 can rotate about the axis 89 of the coupling roller 14**. The coupling roller formed as a centrifugal mass, as shown in FIG. 5*a*, carries pins 88 on its front wall. If one slides the driving roller 84 along the axis 89 of the coupling roller, and turns it relative to the coupling roller 14, then one of these pins 88 engages in the hook 87 of the driving roller, so that the driving roller 84 resiliently takes up the coupling roller 14. The helical spring is so proportioned that it allows approximately a complete revolution of the coupling roller 14 relative to the driving roller 84.

*The speech head*

The speech head 20 contains a combined recording and reproducing head and an erasing head in a common housing, not shown. The erasing head is disposed, during forward running, in front of the recording and reproducing head, and thereby renders erasing of the sound carrier possible before every new recording. The erasing head is automatically switched on by depressing the recording button 11 and is also automatically switched off again when this button springs up. Therefore, the sound carrier 26 is positively erased before every recording, which ensures that double recordings are not made on said carrier. The sound carrier 26 may be erased by the application of high frequency or of direct current. During rewinding, the coupling roller 14 is changed over and held against the rewind plate 27 by means of the reversing rod 15. The rewind driving plate 27 is fixedly connected with a spindle 28 and a hub 29 for a spool 30. Thus, for example on rewinding, the spool 30 is driven by the coupling roller 14 and the sound carrier 26 is wound back. The transmission ratios of the coupling roller 14 to the forward driving plate 16 and to the rewind driving plate 27 are so selected that the rewind run takes place considerably faster, for example, ten times more quickly, than the forward run. During the forward run, a weak brake (not shown) acts on the rewind plate 27 to tension the sound carrier 26. Likewise, during the return run, an equally weak brake acts on the forward driving plate 16.

During the forward run, the spindle 17, driven by the coupling roller 14, directly and positively controls the speech head drive 22, 23, 24. During the return run, on the other hand, the reciprocal movement of the head is effected solely by unwinding of the sound carrier 26 from the spool 19, which is connected with the spindle 17.

When the forward or the rewind movement is stopped, the stop button 8 actuates a stop brake 32, by means of a stop lever 31 and in FIG. 2, the brake 32 is shown engaged with the rewind driving plate 27. Lever 31 similarly actuates a stop brake (not shown) which at the same time stops the forward driving plate 16. By this means both driving plates 16, 27 and therewith both spools 19, 30 are braked each time during stopping.

*The sound carrier position indicator*

From the gear 22 of the speech head control mechanism, a gear wheel acts on the flexible shaft 34, and, via the worm 75, worm wheel 78 and a belt 36, transmits its rotation to a position indicating roller 35. The reduction gear of the driving mechanism to the position indicating roller 35 is so selected that the total duration of the run of the sound carrier 26 just corresponds to a complete revolution of the roller 35. The surface of the roller 35 is divided into two different-coloured sections **35*a* and 35*b*. When the roller rotates, the boundary line 35*c* of the two sections 35*a*, 35*b* cuts a marker line 37** at a point *x*, whose position is displaced along the marker line 37 in a window of the housing of the device, in accordance with the time taken during the running off of the sound carrier, and thus indicates the length of the sound carrier already run off and therewith the length of wire still available for further recording. Definite positions on the sound carrier 26 can easily be found again with the aid of this position indicator.

*The push buttons*

The buttons 10 and 11 place the device in a condition for recording or reproduction respectively, the button 9 starts the rewind motion, and the button 8 is a stop button. Depressing the button 11, which actuates the recording- reproduction switch 38, switches over the amplifier (not illustrated) into a recording condition. If on the other hand button 10 is depressed, the amplifier and the device are switched into condition for reproduction.

The set of push buttons 8, 9, 10, 11 is constructed in such a way that on pressing one button, a previously operated one is always released and restored to its normal inoperative position again. When one of the buttons 8, 9, 10, 11 is pressed, a tab 40 thereon easily moves an associated pawl 39 on the press button assembly downwards, until on complete depression of the button the pawl 39 is again freed from the tab 40, so that the previously operated push button is of itself able to return upwards again into the initial position. (See FIGS. 9 and 10.) On pressing the next button again, the button just operated then itself springs back into its inoperative position. This return movement of the button is effected by a spring (not shown). The tab 40 of the button which is next depressed then again engages behind the associated pawl 39.

*The battery-voltmeter*

The voltage of the battery 5 of the motor is measured by a voltmeter 41, which is fitted on the front of the recording and reproducing device itself. The indicator 42 of the voltmeter 41 moves on the surface of the cylindrical voltmeter, and constant observation is effected through a window in the housing even when the device as a whole is enclosed.

*The speed governor*

The centrifugal contact governor, generally indicated by 4, is located on the motor spindle and consists of an insulating member 46 having a hub 47 with the two slip rings 48 and 49. The slip ring 48 is connected with a spring mounted contact 50 having a centrifugal weight 51, and the slip ring 49 is connected with a spring mounted contact 52 having a centrifugal weight 53. For driving at lower speed, the contact 12 is opened, and the motor circuit is closed by one of the slip rings through its associated contact 50 or 52 and the fixed contact 54. The springs 55 and 56 have different spring tensions, and this way the centrifugal weight 51 or 53 as the case may be, subjected to the weaker spring action, effects the regulating operation. If the slip rings 48 and 49 are closed by the switch 12 (see FIG. 2), however, the governor operates at a higher speed, since the contact actuated by the centrifugal weight subjected to the weaker spring action in this case remains permanently open, and only the other contact urged by the more powerful spring governs the motor speed. The circuit of the governor is closed by contact 57, on which slides a current supply spring. The friction of the centrifugal weights on the walls 58 and 59 of the bores is controllable to a considerable extent, and by choice of material and tolerances can be so determined that the centrifugal weights are not able to oscillate. At the same time the governor has only a very small inherent unbalance, and in any event can easily be counterbalanced.

*Mounting of spools*

As shown in FIG. 6 the spool 19 is fitted on the recording hub 18, which is fixedly connected with the spindle 17. When the spool 19 is mounted, a conical counterbore 60 therein fits on a cooperating conical surface 61 of the hub. Thus, a ball 62 carried in the hub 18 engages against an upper conical counterbore 65 of the spool under the pressure of a spring 64, and in this way tends further to press down the spool 19 on the conical surface 61 of the hub. In this way a tight, slip-free fit is achieved between the hub and the spool. In order that the spool 19 shall not be able to tilt on the hub 18, a cylindrical guide shaft is provided which carries the spool 19 absolutely vertical even when the conical surfaces 60 and 61 are of small angular extent.

*The end cut-out device for the driving mechanism*

The end cut-out device shown in FIGS. 7 and 8 operates in the following manner: in the recording spool 19 is situated a bell crank lever 66, mounted to be pivotal about a spindle 65. On winding the spool, the sound carrier 26 presses the bell crank lever 66 into a groove of the hub of the recording spool 19, so that it is level with the wound surface. When the last turn of the sound carrier is run off from the bell crank 66, however, a spring 67 presses this lever 66 outwards by turning it about the pin 65. Then the arm 66_a_ of the bell crank lever 66 moves up to the contact 68, which is carried on a spring 74, and opens it. The contact 68 is situated in the motor circuit.

The reserve spool 30 has a similar bell crank lever 69, which likewise can be pivoted outwards about a pin 71, by means of a spring 70, when the last winding is run off, so that by means of its arm 69_a_ it opens the contact 72 carried on spring 73, which is also in series with the motor circuit. For this purpose the force exerted by the springs 67 and 70 must be smaller than the tension of the sound carrier 26 during winding. Opening of the contacts 68 and 72 stops the motor driving mechanism. As soon as the spool 19 or 30 respectively is wound again, the contact 68 or 72 respectively also closes again.

In FIG. 8 the contact 68 is closed, while the contact 72 has just been opened by the bell crank lever 69, which acts against the spring 73 of the contact 72.

On switching on the driving mechanism again, a motor circuit holding switch 77 (FIG. 2) is closed. In fact this holding switch is closed on each actuation of the push buttons. For this purpose, the pawl 39 of each push button (FIGS. 9, 10) presses against a lever 76 carrying the holding switch 77, and closes it. The holding switch 77 remains closed for at least one complete revolution of the spool. When the push button is fully pressed down (see FIG. 10) the lever 76 is again freed from the pawl 39, so that the holding switch 77 can open again.

During the winding process, a spring 79 constantly presses lightly on the sound carrier 26 (see FIG. 2). The spring 79 assures a permanently constant contact pressure on the recording head 20 and helps to give a good recording and reproduction and to prevent the sound carrier 26 from flying off the recording head.

By means of the holding switch 77, the motor, when switched on again or reversed, runs as long as the switch 77 remains closed. During this period, the wound sound carrier 26 presses the bell crank lever 66 or 69 respectively into the spool 19 or 30 respectively, whereupon the contact 68 or 72 respectively is again closed, so that the driving mechanism functions again, even when the holding switch 77 re-opens. In order that the driving mechanism is always stopped again before the spool is completely wound off and the sound carrier 26 does not break, the sound carrier 26 is displaced by 180° relative to the bell crank lever 66 or 69 fixed on the spools 19 or 30 respectively.

We claim:

1. A miniature magnetic pocketable recorder for sound recording and reproducing on a magnetically modulatable and erasable sound carrier having a built-in amplifier, comprising two spaced spools for winding and rewinding said sound carrier, an electric motor, a circuit for said motor, a reversible drive mechanism driven by said electric motor for driving said spools, a speed governor for changing the speed of said motor to either of two selected speeds, a governor contact, a pair of slip rings on said governor, a bridging contact in said circuit controlling said speed governor via said slip rings, manually operated switching means in said circuit controlling said drive mechanism to drive said spools forwardly, reversely and to stop the same, an indicator device controlled by the rotation of one of said spools for indicating the position of the sound carrier thereon and an end cut-out upon each spool controlling said circuit for automatically cutting said circuit and thereby stopping said drive mechanism when said sound carrier has run off one of said spools.

2. A miniature magnetic recorder according to claim 1, wherein said manually operated switching means comprise two separate push buttons for recording and reproducing.

3. A miniature magnetic recorder according to claim 1, wherein said governor is provided with two centrifugal systems for two different speeds.

4. A miniature magnetic recorder according to claim 1, wherein a driving plate is connected to each spool and a coupling roller is provided selectively frictionally engageable with said plates, said roller having two frictional driving surfaces of different diameters and being pressed against said driving plates resiliently for compensating frictional wear.

5. A miniature magnetic recorder according to claim 1, wherein said indicator comprises a time marker, a roller having on its external surface two differently colored sections meeting obliquely to the roller axis and whose junction intersects said time marker and said roller is coupled by a reduction gearing with said drive mechanism.

6. A miniature magnetic pocketable recorder for sound recording and reproducing on a magnetically modulatable and erasable sound carrier having a built-in amplifier, comprising two spaced spools for winding and rewinding said sound carrier, an electric motor, a circuit for said motor, a reversible drive mechanism driven by said electric motor for driving said spools, a speed governor for changing the speed of said motor to either of two selected speeds, a governor contact, a pair of slip rings on said governor, a bridging contact in said circuit controlling said speed governor via said slip rings, manually operated switching means in said circuit controlling said drive mechanism to drive said spools forwardly, reversely and to stop the same, an indicator device controlled by the rotation of one of said spools for indicating the position of the sound carrier thereon and an end cut-out upon each spool controlling said circuit for automatically cutting said circuit and thereby stopping said drive mechanism when said sound carrier has run off one of said spools, said end cut-out comprising a bell crank lever tiltable about an axis transverse to the spool axis, the main arm of said bell crank lever being located in a slot of the spool hub reaching over the entire height of the spool flush with the winding surface, and whose second, shorter and rectangularly attached arm is located in a slot of the spool flange cooperating with a contact in said circuit to open the same when said bell crank lever is tilted.

7. A miniature magnetic recorder according to claim 6, wherein under each spool in the path of motion of the smaller bell crank lever arm tilted out of the spool flange a fixed switch is provided which can be opened by the shorter bell crank lever arm, thus interrupting the motor circuit.

8. A miniature magnetic pocketable recorder for sound recording and reproducing on a magnetically modulatable and erasable sound carrier having a built-in amplifier, comprising two spaced spools for winding and rewinding said sound carrier, an electric motor, a circuit for said motor, a reversible drive mechanism driven by said electric motor for driving said spools, a speed governor for changing the speed of said motor to either of two selected speeds, a governor contact, a pair of slip rings on said governor, a bridging contact in said circuit controlling said speed governor via said slip rings, manually operated switching means in said circuit controlling said drive mechanism to drive said spools forwardly, reversely and to stop the same, an indicator device controlled by the rotation of one of said spools for indicating the position of the sound carrier thereon and an end cut-out upon each spool controlling said circuit for automatically cutting said circuit and thereby stopping said drive mechanism when said sound carrier has run off one of said spools, fixed switches for opening a contact in series in said motor circuit, and at switching said drive mechanism from one run-out state to the other direction a holding switch is provided for forward and rewind running, said holding switch switching said drive mechanism on for at least one complete spool revolution independently of the position of the fixed switches.

9. A miniature magnetic recorder according to claim 7 wherein a fixed switch is provided for opening a rest contact being in series with one another and with the motor circuit, and that at switching the drive mechanism from one run-out state to the other direction a holding switch is provided for forward and rewind running, said holding switch bridging the rest contacts and switching the drive mechanism on for at least one complete spool revolution independently of the position of the fixed switches.

References Cited in the file of this patent

UNITED STATES PATENTS

| | | |
|---|---|---|
| 1,560,721 | O'Reilly | Nov. 10, 1925 |
| 1,619,005 | Strong | Mar. 1, 1927 |
| 2,306,162 | Gipe | Dec. 22, 1942 |
| 2,419,476 | Begun | Apr. 22, 1947 |
| 2,429,703 | Vogtborg | Oct. 28, 1947 |
| 2,484,552 | Camras | Oct. 11, 1949 |
| 2,609,457 | Thum | Sept. 2, 1952 |
| 2,616,982 | Gray | Nov. 4, 1952 |
| 2,655,563 | Connell | Oct. 13, 1953 |
| 2,676,212 | Williams | Apr. 20, 1954 |
| 2,677,727 | Haynes | May 4, 1954 |
| 2,713,618 | McNabb | July 19, 1955 |
| 2,726,288 | Ellis | Dec. 6, 1955 |
| 2,732,437 | Travis | Jan. 24, 1956 |
| 2,779,836 | Williams | Jan. 29, 1957 |
| 2,782,263 | Hoehn | Feb. 19, 1957 |
| 2,793,039 | Hironimus | May 21, 1957 |
| 2,802,442 | Helgeby | Aug. 13, 1957 |
| 2,893,737 | Travis | July 7, 1959 |

OTHER REFERENCES

Rider's Specialized Tape Recorder Manual, vol. 1, January 1955, VM model 700 series, pages 197–202, 209 and 210; Wilcox Gay models 3F10, 4F10, pages 257–267. (Copy in U.S. Patent Office Library.)

Radio's Master, copyright 1953, page E–13. (Copy in U.S. Patent Office Design Div.)